United States Patent
Lee et al.

(10) Patent No.: US 9,225,947 B2
(45) Date of Patent: Dec. 29, 2015

(54) IMAGE PICKUP APPARATUS, METHOD OF PROVIDING COMPOSITION OF IMAGE PICKUP AND COMPUTER-READABLE RECORDING MEDIUM

(71) Applicant: Samsung Electronics Co., Ltd., Suwon-si, Gyeonggi-do (KR)

(72) Inventors: Yun-gu Lee, Seongnam-si (KR); Duck-chan Seo, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 211 days.

(21) Appl. No.: 13/710,637

(22) Filed: Dec. 11, 2012

(65) Prior Publication Data

US 2013/0155293 A1 Jun. 20, 2013

(30) Foreign Application Priority Data

Dec. 16, 2011 (KR) .................. 10-2011-0136689

(51) Int. Cl.
H04N 9/04 (2006.01)
H04N 5/232 (2006.01)

(52) U.S. Cl.
CPC .......... *H04N 9/045* (2013.01); *H04N 5/23238* (2013.01); *H04N 5/23293* (2013.01); *H04N 5/23216* (2013.01); *H04N 5/23222* (2013.01)

(58) Field of Classification Search
None
See application file for complete search history.

(56) References Cited

U.S. PATENT DOCUMENTS

| | | | | |
|---|---|---|---|---|
| 5,266,985 A * | 11/1993 | Takagi | ............... | 396/147 |
| 6,957,073 B2 * | 10/2005 | Bye | ............... | 455/456.1 |
| 6,977,676 B1 * | 12/2005 | Sato et al. | ............... | 348/211.11 |
| 7,417,672 B2 * | 8/2008 | Nakajima et al. | ......... | 348/231.3 |
| 7,929,796 B2 * | 4/2011 | Funayama | ............... | 382/274 |
| 8,412,031 B2 * | 4/2013 | Teshima | ............... | 396/49 |
| 8,976,267 B2 * | 3/2015 | Kiyoshige | ............... | 348/231.99 |
| 2002/0085111 A1 * | 7/2002 | Heiman | ............... | 348/333.01 |
| 2003/0058255 A1 * | 3/2003 | Yamagishi | ............... | 345/619 |
| 2004/0189849 A1 * | 9/2004 | Hofer | ............... | 348/333.03 |
| 2005/0276596 A1 * | 12/2005 | Chan et al. | ............... | 396/296 |
| 2006/0158534 A1 * | 7/2006 | Gotohda | ............... | 348/239 |
| 2006/0268129 A1 * | 11/2006 | Deng | ............... | 348/239 |
| 2007/0103544 A1 * | 5/2007 | Nakazawa | ............... | 348/38 |
| 2007/0222797 A1 * | 9/2007 | Misawa et al. | ............... | 345/629 |
| 2007/0253698 A1 * | 11/2007 | Park et al. | ............... | 396/296 |
| 2009/0086047 A1 * | 4/2009 | Suehiro | ............... | 348/222.1 |
| 2009/0231457 A1 * | 9/2009 | Lee et al. | ............... | 348/222.1 |
| 2009/0244324 A1 * | 10/2009 | Saito et al. | ............... | 348/231.99 |
| 2009/0284582 A1 * | 11/2009 | Mei et al. | ............... | 348/36 |
| 2009/0290047 A1 * | 11/2009 | Sogoh et al. | ............... | 348/240.99 |
| 2010/0002071 A1 * | 1/2010 | Ahiska | ............... | 348/36 |
| 2010/0073487 A1 * | 3/2010 | Sogoh et al. | ............... | 348/207.1 |
| 2010/0111441 A1 * | 5/2010 | Xiong et al. | ............... | 382/275 |

(Continued)

FOREIGN PATENT DOCUMENTS

| | | |
|---|---|---|
| JP | 2009-094724 | 4/2009 |
| JP | 2009-212804 | 9/2009 |
| JP | 2009-282143 | 12/2009 |

*Primary Examiner* — Michael Osinski
(74) *Attorney, Agent, or Firm* — Staas & Halsey LLP

(57) ABSTRACT

An image pickup apparatus includes an image capturing unit which captures an image, a control unit which controls the image capturing unit to generate a wide-angle image, a composition calculating unit which calculates an optimum composition of image pickup using the generated wide-angle image, and a user interface unit which provides composition guide information to capture the image according to the calculated optimum composition of image pickup.

17 Claims, 6 Drawing Sheets

(56) References Cited

U.S. PATENT DOCUMENTS

| | | | |
|---|---|---|---|
| 2010/0265313 A1* | 10/2010 | Liu et al. | 348/36 |
| 2011/0074671 A1* | 3/2011 | Shimosato et al. | 345/156 |
| 2011/0193941 A1* | 8/2011 | Inaba et al. | 348/46 |
| 2011/0242274 A1* | 10/2011 | Yamaji | 348/36 |
| 2011/0242369 A1* | 10/2011 | Misawa et al. | 348/240.2 |
| 2012/0026364 A1* | 2/2012 | Kuma | 348/231.99 |
| 2012/0075412 A1* | 3/2012 | Miyamoto et al. | 348/36 |
| 2012/0120187 A1* | 5/2012 | Goto et al. | 348/36 |
| 2012/0154442 A1* | 6/2012 | Takaoka et al. | 345/634 |
| 2012/0194636 A1* | 8/2012 | Tokunaga et al. | 348/36 |
| 2012/0257007 A1* | 10/2012 | Matsumoto et al. | 348/36 |
| 2012/0300019 A1* | 11/2012 | Yang et al. | 348/36 |
| 2012/0300051 A1* | 11/2012 | Daigo et al. | 348/77 |
| 2013/0033566 A1* | 2/2013 | Sento | 348/36 |
| 2013/0050406 A1* | 2/2013 | Morimoto | 348/37 |
| 2013/0063427 A1* | 3/2013 | Muraki | 345/419 |
| 2013/0093840 A1* | 4/2013 | Ichikawa et al. | 348/36 |
| 2013/0135464 A1* | 5/2013 | Kuroki | 348/135 |
| 2013/0141524 A1* | 6/2013 | Karunamuni et al. | 348/38 |
| 2013/0222612 A1* | 8/2013 | Sako et al. | 348/207.1 |
| 2013/0294650 A1* | 11/2013 | Fukumiya et al. | 382/103 |

* cited by examiner (a)

(b)

(d)

(c)

IMAGE PICKUP APPARATUS, METHOD OF PROVIDING COMPOSITION OF IMAGE PICKUP AND COMPUTER-READABLE RECORDING MEDIUM

CROSS-REFERENCE TO RELATED APPLICATIONS

This application claims priority from Korean Patent Application No. 10-2011-0136689, filed on Dec. 16, 2011, in the Korean Intellectual Property Office, the disclosure of which is incorporated herein by reference in its entirety.

BACKGROUND OF THE INVENTION

1. Field of the Invention

Apparatuses, methods and computer-readable recording media consistent with what is disclosed herein relates to image pickup, and more particularly, to an image pickup apparatus which generates a wide-angle image, calculates an optimum composition of image pickup using the generated wide-angle image, and provides composition guide information based on the calculated optimum composition of image pickup to a user, a method of providing composition of image pickup, and a computer-readable recording medium.

2. Description of the Related Art

The advancement in the field of electronic technology has also enabled development and distribution of image pickup apparatuses of various functions. Small-sized digital cameras or digital camcorders easily carried around by the users are some examples.

The currently-available digital cameras provide an image taking guide which enables a user to acquire an optimum image. The function of providing an image taking guide helps the user to obtain an image of better quality by providing information acquired as a result of processing an image signal that enters a digital camera/camcorder through a lens.

For example, the function of providing an image taking guide includes a function of displaying a highlighting point of the light and histogram based on an image signal entering a lens at the time of taking an image to enable a user to adjust exposure at the time of taking an image, a function of face and facial expression recognition to prevent a subject of photography from deviating from an angle range of a photographed image or to prevent the situation of photographing a subject at the time when the eyes of the subject of photography close, or a function of marking a guideline on the image display screen to enable a user to set optimum composition to acquire a better image.

However, such guide functions provide limited guide information only, because the information is based on an image signal within field of view (FOV) viewable by a user through a viewfinder or display device, i.e., based on an image signal within a range of an image entering an image pickup apparatus, such as a camera or camcorder. That is, since the guide information is provided to the user by utilizing an image signal within a limited field of view (FOV) by zoom-in/zoom-out, the user is provided with limited range of compositions for image pickup.

SUMMARY OF THE INVENTION

Exemplary embodiments of the present inventive concept overcome the above described limitations and other limitations not described above. Also, the present inventive concept provides additional utilities other than overcoming the limitations described above, and an exemplary embodiment of the present inventive concept may not be directed to overcoming any of the problems described above, but to other advancements in the technology.

Additional features and utilities of the present general inventive concept will be set forth in part in the description which follows and, in part, will be obvious from the description, or may be learned by practice of the general inventive concept.

Exemplary embodiments of the present general inventive concept provide an image pickup apparatus which generates a wide-angle image, calculates an optimum composition of image pickup by using the generated wide-angle image, and provides composition guide information based on the calculated optimum composition for image pickup, a method of providing composition for image pickup and a computer-readable recording medium comprising the method.

In an exemplary embodiment, an image pickup apparatus may include an image capturing unit which captures an image, a control unit which controls the image capturing unit to generate a wide-angle image, a composition calculating unit which calculates an optimum composition of image pickup using the generated wide-angle image, and a user interface unit which provides composition guide information to capture the image according to the calculated optimum composition of image pickup.

The image capturing unit may capture a plurality of images having overlapping image pickup areas, and the image pickup apparatus may additionally include an image processing unit which generates a wide-angle image using the plurality of captured images.

The image capturing unit may capture a video having changed direction of capturing an image of the image pickup apparatus, and the image pickup apparatus may additionally include an image processing unit which generates a wide-angle image using the captured video.

The image capturing unit may include a first image capturing unit which captures an image using a first lens which can change a zoom ratio, and a second image capturing unit which captures a wide-angle image using a second lens which has a fixed ratio, and the control unit may control the second image capturing unit to generate a wide-angle image, and the composition calculating unit may calculate an optimum composition of image pickup with respect to an image to be captured through the first image capturing unit, using the wide-angle image generated at the second image capturing unit.

The composition calculating unit may detect a subject of image pickup within the generated wide-angle image, and calculate an optimum composition of image pickup with respect to the detected subject of image pickup.

The composition calculating unit may distinguish scenes of the generated wide-angle image, and calculate the optimum composition of image pickup based on the distinguished scenes.

The image pickup apparatus may additionally include a storage unit which stores a user's preferred composition information, wherein the composition calculating unit may calculate the optimum composition of image pickup based on the user's preferred composition information.

The user interface unit may display a currently-captured image along with an image according to the calculated optimum composition of image pickup.

The user interface unit may indicate to the user if determining that a currently-captured image is according to the calculated optimum composition of image pickup.

The image pickup apparatus may additionally include a position determining unit which detects a position and direction of capturing an image of the image pickup device, and a storage unit which stores a plurality of optimum image pickup positions, wherein the user interface unit may provide position guide information so that an image is captured at the optimum position which is previously stored at the storage unit.

Exemplary embodiments of the present general inventive concept may also provide a method of providing a composition of image pickup of an image pickup apparatus, the method including generating a wide-angle image, calculating an optimum composition of image pickup using the generated wide-angle image, and providing composition guide information to capture the image according to the calculated optimum composition of image pickup.

The generating of the wide-angle image may include capturing a plurality of images having overlapping image pickup areas, and generating a wide-angle image using the plurality of captured images.

The generating of the wide-angle image may include capturing video having changed direction of capturing an image of the image pickup apparatus, and generating a wide-angle image using the captured video.

The calculating may include detecting a subject of image pickup within the generated wide-angle image, and calculating an optimum composition of image pickup with respect to the detected subject of image pickup.

The calculating may include distinguishing scenes of the generated wide-angle image, and calculating the optimum composition of image pickup based on the distinguished scenes.

The calculating may include calculating the optimum composition of image pickup based on pre-stored user's preferred composition information.

The providing may include displaying a currently-captured image along with an image according to the calculated optimum composition of image pickup.

The providing may include indicating so, if determining that a currently-captured image is according to the calculated optimum composition of image pickup.

The method of providing a composition of image pickup of an image pickup apparatus may include detecting position and direction of capturing an image of the image pickup apparatus, and providing position guide information so that an image is captured at the optimum position which is previously stored.

In a computer-readable recording medium comprising a program to execute a method of providing composition of image pickup, the method may include generating a wide-angle image, calculating an optimum composition of image pickup using the generated wide-angle image, and providing composition guide information to capture the image according to the calculated optimum composition of image pickup.

Exemplary embodiments of the present general inventive concept may also provide an image processing apparatus, comprising: an image processing unit to general a wide-angle image from one of a plurality of captured images and a video with changed image pickup positions captured; a composition calculating unit which calculates an optimum composition of image pickup using the generated wide-angle image; and a user interface unit which provides composition guide information to capture the image according to the calculated optimum composition of image pickup.

In an exemplary embodiment, the image processing apparatus further comprises: an image capturing apparatus to capture the image, the image capturing apparatus including a first image capturing unit including a zoom ratio lens and to convert received light into digital form as an image, and a second image capturing unit including a fixed ratio lens with a wide-angle and to convert received light into digital form as a wide-angle image; and an interface to send the converted images to the image processing unit.

In an exemplary embodiment, the composition calculating unit calculates an optimum composition of image pickup with respect to an image to be captured through the first image capturing unit, using the wide-angle image generated at the second image capturing unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
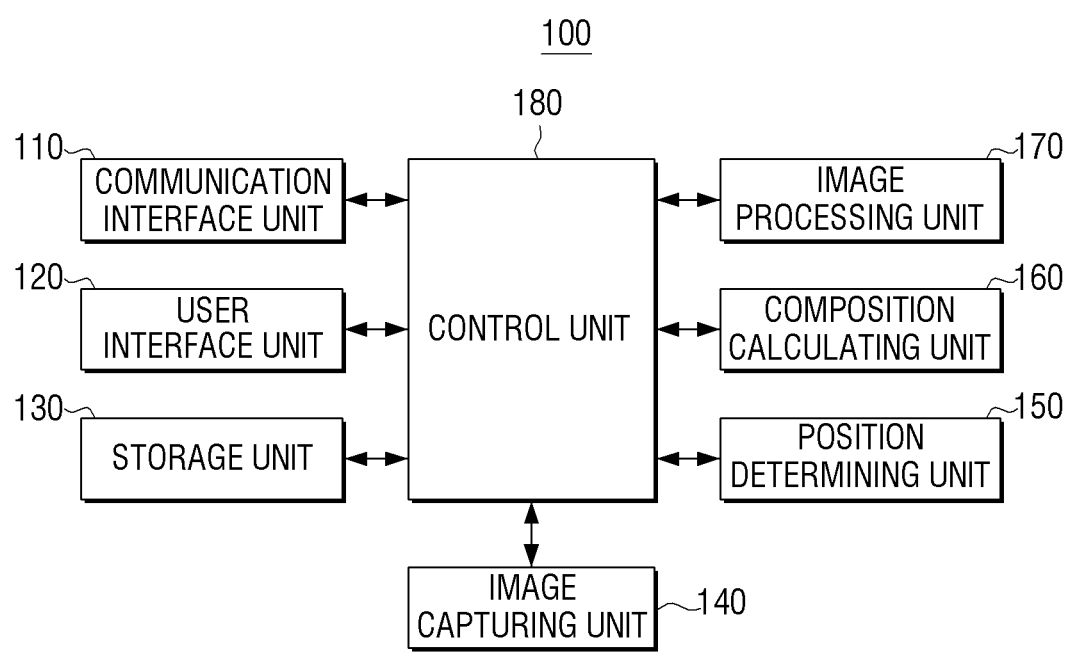
FIG. 1 is a block diagram of an image pickup apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram of an image pickup apparatus according to an exemplary embodiment.

Referring to FIG. 1, an image pickup apparatus 100 according to an embodiment may include a communication interface unit 110, a user interface unit 120, a storage unit 130, an image capturing unit 140, a position determining unit 150, a composition calculating unit 160, an image processing unit 170 and a control unit 180. Depending on embodiments, the image pickup apparatus 100 may be a digital camera, a camcorder, a mobile phone, a PMP, a Webcam, or a black box which is capable of capturing an image.

The communication interface unit 110 is formed to connect to at least one terminal (not illustrated), and is connectible to the terminal not only by a wired or wireless manner including a Local Area Network (LAN) and the Internet, but also via a Universal Serial Bus (USB) port, Bluetooth module, or the like.

The communication interface unit 110 sends the content stored by the image pickup device 100 to an external terminal (not illustrated). For example, the communication interface unit 110 may send the image files stored at the storage unit 130 (to be explained below) to an external terminal (not illustrated) or server. As used herein, the 'content' may refer to image content, or video content that can be generated by the image pickup device 100.

The user interface unit 120 may include a plurality of function keys with which a user can set or select various functions supported by the image pickup device 100, and may display various information provided by the image pickup device 100. The user interface unit 120 may be implemented in the form such as a touchpad that enables both input and output, or in the combined form such as a combination of an input (e.g., a plurality of buttons) and a display (e.g., LCD, OLED, etc.).

The user interface unit 120 receives from a user various control commands including a live-view display command, a half-shutter command (or auto focusing command), or a shutter command (or an image taking command). The user interface unit 120 then receives settings related to image taking. For example, the user interface unit 120 may receive settings related to a file format in which the captured image is stored, and resolution of the captured image, whether or not composition in one embodiment is provided, whether or not digital zoom is used, or Auto White Balance (AWB), Auto Focus (AF) or Auto Exposure (AE).

The user interface unit 120 may display a live-view image. For example, the user interface unit 120 may display a live-view image captured through the image capturing unit 140 (to be explained below) based on the live-view display command input by a user. The 'live-view' refers to a function of displaying an image captured through the image capturing unit 140 on a user interface window instead of in the viewfinder.

The user interface unit 120 may also display the captured image. For example, the user interface unit 120 may display a captured image according to an input of a user's image capture command.

In response to a user's playback command, the user interface unit 120 may display various contents stored at the storage unit 130. The stored content to be displayed may include image content or video content. By way of example, if the image pickup device 100 supports video capturing, the user interface unit 120 may playback the video content previously stored at the storage unit 130.

The user interface unit 120 may receive a user's preferred composition information. For example, the user interface unit 120 may receive information related to a user's preferred composition such as a stable composition, a tension composition, a symmetric composition, a peaceful composition, a motion composition, a circular composition, a diagonal composition, a triangular composition, etc. The user's preferred composition information received from the user may be stored at the storage unit 130.

The user interface unit 120 provides a composition guide. For example, the user interface unit 120 may provide a composition guide so that an image is captured according to an optimum composition of image pickup calculated at a composition calculating unit 160 (to be explained below). The 'composition guide' herein refers to information that provides a zoom guide, an image capturing direction guide, or the like in the form of a message or indicating lines so that the user can capture an image according to the optimum calculated composition of image pickup. The user interface unit 120 may display the currently-capturing image (i.e., live-view image) along with the image according to the calculated optimum composition of image pickup, can determine whether the currently-capturing image (i.e., live-view image) is in the optimum composition of image pickup, and can indicate the result of the determination.

The user interface unit 120 also provides a position guide. For example, the user interface unit 120 may provide information according to which the user captures an image at the pre-stored optimum image pickup position and optimum image pickup direction. The position guide is information provided to the user relating to a pre-stored image pickup position so that the user captures an image at the pre-stored image pickup position. By way of example, in order to take a photograph of the Eiffel Tower, the image pickup device 100 may provide the best position to capture the image of the tower as the position guide. At this time, the user interface unit 120 may provide a map of the optimum image pickup position and/or an optimum image pickup direction in which to move.

The storage unit 130 stores the captured images. For example, the storage unit 130 may store the image and videos captured through the image capturing unit 140, which will be explained below. The storage unit 130 may temporarily store the wide-angle image generated at the image processing unit 170 (to be explained below). The storage unit 130 may store the image compensated at the image processing unit 170 (to be explained below), and store the final form of content generated at the image processing unit 170 (to be explained below).

The storage unit 130 stores a user's preferred composition information. The 'user's preferred composition information' herein may refer to the compositions preferred by the user such as a stable composition, a tension composition, a symmetric composition, a peaceful composition, a motion composition, a circular composition, a diagonal composition, a triangular composition, etc.

The storage unit 130 also stores an optimum image pickup position. The optimum image pickup position may include information regarding an optimum position to capture an image in a specific geographic area (e.g., GPS) and information regarding an optimum direction at which an image is captured in the corresponding position. The information may be previously generated and stored by a manufacturer, and updated by the user. The information regarding the optimum image pickup position may include information about one, or a plurality of positions of a specific geographic area.

The storage unit 130 may be implemented as an imbedded storage medium in the image pickup device 100, or an external storage medium such as removable disk including a USB memory, or a flash memory, a storage medium connected to the image pickup device, or a web server connected via a network (other storage means may include "Cloud" processing storage). The storage unit 130 may include a volatile memory (e.g., DRAM) to drive the image processing unit 170 and the control unit 180.

The image capturing unit 140 captures an image. For example, the image capturing unit 140 may be implemented as one, or a plurality of image capturing devices. An embodiment will be explained below with reference to an example where the image capturing unit 140 is implemented as one image capturing device, and another embodiment in which the image capturing unit 140 is implemented as a plurality of image capturing devices will then be explained with reference to FIG. 2.

If the image capturing unit 140 is implemented as one image capturing device, the image capturing unit 140 may capture a plurality of images with overlapping image capturing areas, according to a control of the control unit 180 (to be explained below). Or, the image capturing unit 140 may capture video, in which case the image pickup device 100 has varying image pickup direction. The plurality of images or videos captured by the operation explained above are sent to the image processing unit 170 (to be explained below) and used for generating a wide-angle image.

The image capturing unit 140 may capture a live-view image. The image capturing unit 140 may also capture an image based on a user's command to capture an image. The generated image may be the image which is captured according to the composition guide information explained above.

The position determining unit 150 detects a position and an image pickup direction of the image pickup device 100. For example, the position determining unit 150 may detect a position of the image pickup device 100 using a GSP device or the like, and may detect an image pickup direction of the image pickup device 100 using a geomagnetic sensor, or the like.

The composition calculating unit 160 may calculate an optimum composition of image pickup using a wide-angle image. For example, the composition calculating unit 160 may detect a subject of image pickup within the wide-angle image using the wide-angle image generated at the image capturing unit 140 or the image processing unit 170, and calculate the optimum composition of image pickup regarding the detected subject of image pickup. By way of example, if a user is taking a photograph of a person in front of a specific object (e.g., building), the composition calculating unit 160 may detect the building and the person as the subjects of image pickup, extract all the available candidates for the composition of image pickup based on the two detected subjects, calculate cost in consideration of a plurality of evaluation standards with respect to the respective extracted candidates for composition of image pickup, and select the optimum composition candidate based on the candidate for composition of image pickup with the highest cost.

At this time, the composition calculating unit 160 may distinguish scenes of the wide-angle image and calculate the optimum composition of image pickup based on the distinguished scenes. To be specific, the composition calculating unit 160 may distinguish a person image, a view image, a night-person image, a night image, a night view image, an inverse-light image, or the like, extract candidates for composition of image pickup corresponding to the distinguished scenes, and select one of these as the optimum composition of image pickup.

The composition calculating unit 160 may calculate optimum composition of image pickup based on the user's preferred composition information. To be specific, the composition calculating unit 160 may calculate optimum composition of image pickup by applying weight to the composition preferred by the user, based on the user's preferred composition information previously stored at the storage unit 130. By way of example, if the user's preferred composition is a circular composition, the user's preferred composition among the extracted candidates may be given a weighting when the optimum composition of image pickup is selected.

Meanwhile, in an exemplary embodiment, only one is selected from among a plurality of candidates for composition of image pickups and provided to the user. However, in another exemplary embodiment, a plurality of candidates for composition of image pickup in the upper category may be provided for the user to select one therefrom.

The image processing unit 170 generates a wide-angle image using a plurality of captured images. For example, the image processing unit 170 may generate a wide-angle image (i.e., panorama image) by combining a plurality of images with overlapping image pickup areas captured through the image capturing unit 140. The image processing unit 170 may generate a wide-angle image by using a video with changed image pickup position captured through the image capturing unit 140.

The image processing unit 170 may perform signal processing such as digital zoom, Auto White Balance (AWB), Auto Focus (AF) or Auto Exposure (AE) to convert a format and adjust an image scale with respect to the generated image. Meanwhile, although not explained in detail, in an exemplary embodiment, an audio signal may be received. In such a case, the image processing unit 170 may generate a video file by combining the plurality of captured images with the audio signal input through a separate internal or external microphone, and store the generated video file at the storage unit 130.

The control unit 180 may control the respective components inside the image pickup device 100. For example, if a wide-angle image is generated, the control unit 180 may control the composition calculating unit 160 to calculate an optimum composition of image pickup with respect to the generated wide-angle image and control the user interface unit 120 to display a composition guide based on the calculated optimum composition of image pickup.

As explained above, in an exemplary embodiment, the image pickup device 100 generates a wide-angle image and calculates an optimum composition of image pickup. Accordingly, the user is enabled to capture even the objects or scenes that would be otherwise omitted due to oversight of the user at the time of capturing an image, and thus can have a greater chance of capturing an image of better composition.

Figure 2:
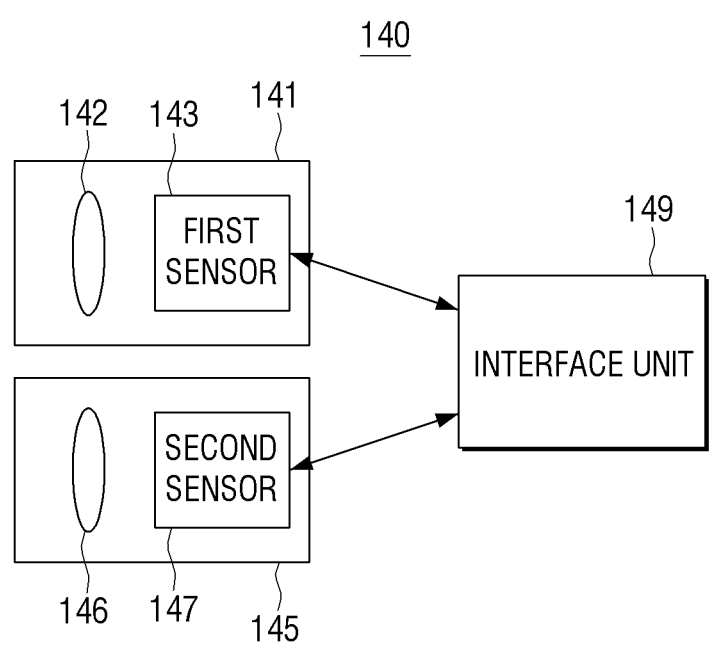
FIG. 2 is a view illustrating a constitution of an image capturing unit according to a another exemplary embodiment.

FIG. 2 is a view illustrating the constitution of the image capturing unit 140 according to another embodiment.

Referring to FIG. 2, the image capturing unit 140 according to the present embodiment may include a first image capturing unit 141, a second image capturing unit 145, and an interface 149.

The interface 149 sends the images captured through the first and second image capturing units 141 and 145 to the image processing unit 170 or the control unit 180, and may send a control command transmitted from the control unit 180 to the first or second image capturing units 141 and 145.

The first image capturing unit 141 may include a first lens 142 and a first image capturing device 143.

The first lens 142 may change a zoom ratio, and collects the light on the subject of image pickup and focuses the optical image on an image pickup area.

The first image capturing device 143 photo-electrically converts the light entering through the first lens 142 into an electric signal, and converts the photo-electrically converted analogue signal into digital form.

The second image capturing unit 145 includes a second lens 146 and a second image capturing device 147.

The second lens 146 has a fixed ratio, and collects light on the subject of image pickup and focuses an optical image on the image pickup area. The second lens 146 may have a wide angle which is same as or wider than zoom-out state of the first lens 142.

The second image capturing device 147 photo-electrically converts the light entering through the second lens 146 into an electric signal, and converts the analogue, photo-electrically converted signal into digital form. Since the second lens 146 has a wide angle which is the same as or wider than that of the first lens 142 in the zoom-out state, the image generated at the second image capturing device 147 may be used as a wide-angle image.

Accordingly, in the embodiment of FIG. 2, since the second image capturing unit 145 is additionally provided to generate a wide-angle image, the operation already explained above to generate a wide-angle image (e.g., capturing a plurality of images, capturing a video, etc.) is unnecessary.

Figure 4:
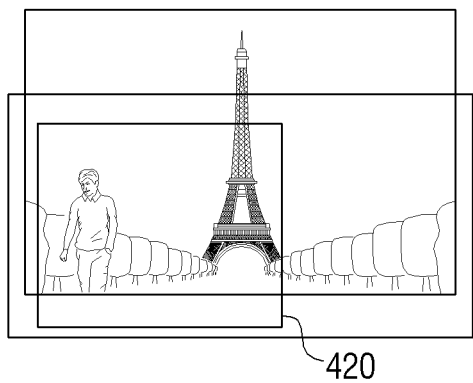
FIGS. 4A to 4D are views provided to explain an operation of calculating composition according to an exemplary embodiment.
Figure 4:
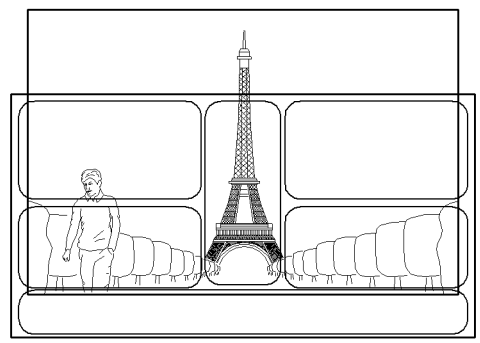
Figure 4:
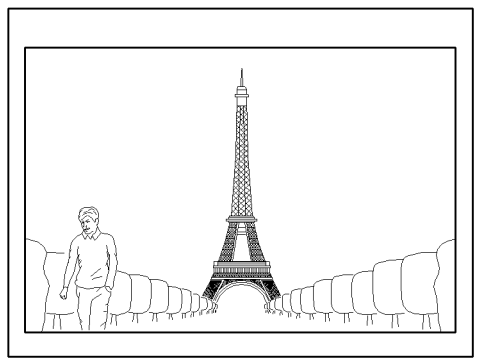
Figure 4:
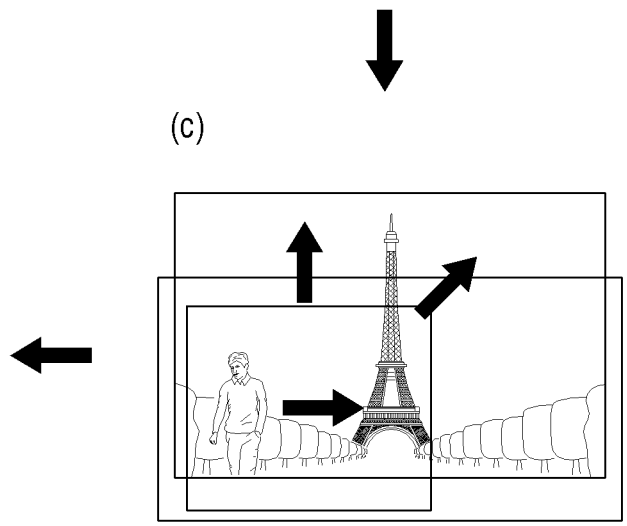

Accordingly, the control unit 180 may have somewhat different operations. This will be explained in detail below with reference to FIG. 4.

Figure 3:
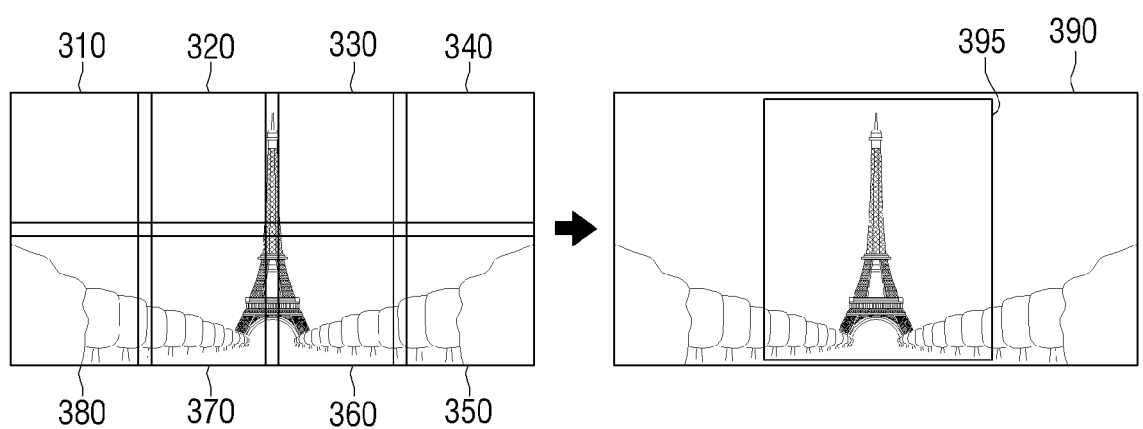
FIG. 3 is a view provided to explain a method of generating a wide-angle image according to an exemplary embodiment.

FIG. 3 is a view provided to explain a method of generating a wide-angle image according to an exemplary embodiment.

Referring to FIG. 3, the image capturing unit 140 may generate a plurality of images 310, 320, 330, 340, 350, 360, 370, 380 having overlapping image pickup areas, and the image processing unit 170 may generate a wide-angle image 390 using the plurality of images. The technique to generate a panorama image using a plurality of image is well known, and therefore, this will not be explained in detail for the sake of brevity. Although the operation of generating a wide-angle image using a plurality of images is explained above with reference to FIG. 3, one will understand that the wide-angle image can be generated using a video.

FIGS. 4A to 4D are views provided to explain an operation of calculating a composition according to an exemplary embodiment.

Referring to FIGS. 4A to 4D, if a half-shutter command is input through the user interface unit 120, the control unit 180 may control the second image capturing unit 145 to capture a wide-angle image. At this time, the image captured through the first image capturing unit 141 may be in the form as illustrated in FIG. 4A (operation 420), and the image captured through the second image capturing unit 145 may be in the form as illustrated in FIG. 4A (operation 410).

Referring to FIG. 4B, the control unit 180 may control the composition calculating unit 160 to calculate the optimum composition of image pickup with respect to an image to be captured through the first image capturing unit 141, based on the wide-angle image generated at the second image capturing unit 145.

Referring to FIG. 4C, the control unit 180 may control the first image capturing unit 141 to capture a live-view image, and may control the user interface unit 120 to display the captured live-view image along with the optimum composition of image pickup calculated at the composition calculating unit 160.

Based on the composition guide as explained above, the user may capture an image as the one illustrated in FIG. 4D.

Figure 5:
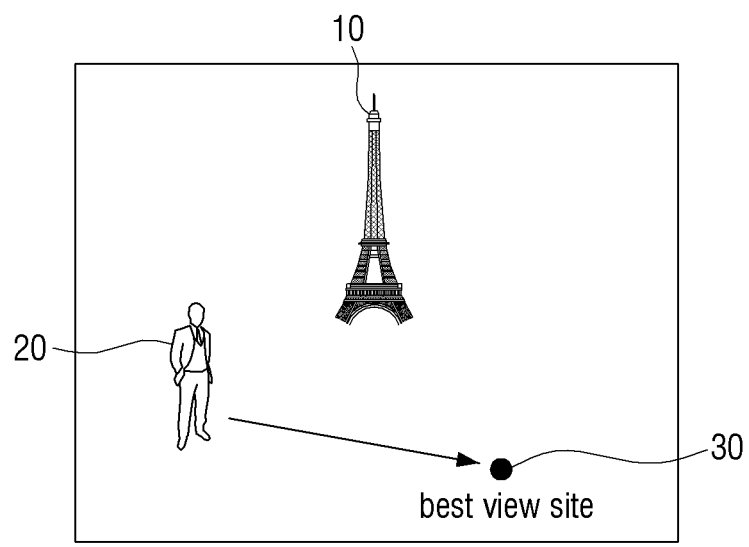
FIG. 5 is a view provided to explain an operation of calculating optimum location according to an exemplary embodiment.

FIG. 5 is a view provided to explain an operation of calculating optimum position according to an exemplary embodiment.

Referring to FIG. 5, the control unit 180 controls the position determining unit 150 to detect the position and the image capturing direction of the image pickup device 100. The control unit 180 may then control the user interface unit 120 to display the captured live-view image along with the optimum composition of image pickup calculated at the composition calculating unit 160.

According to the composition guide, the user is able to capture an image in the form as the one illustrated in FIG. 4D.

FIG. 5 is a view provided to explain an operation of calculating optimum position according to an exemplary embodiment.

Referring to FIG. 5, the control unit 180 controls the position determining unit 150 to detect the position and direction of capturing an image of the image pickup device 100. The control unit 180 may control the user interface unit 120 to display a position guide according to which the user is enabled to compare the detected position and direction of capturing an image with the pre-stored optimum image pickup position information and capture a photograph of the subject 10 of image pickup at the pre-stored optimum image pickup position.

Meanwhile, although an example of where the composition guide and position guide information are displayed through the user interface is explained above with reference to FIGS. 1 to 5, in another embodiment, the composition guide and position guide information may be provided using audio, such as a voice, or the like.

Figure 6:
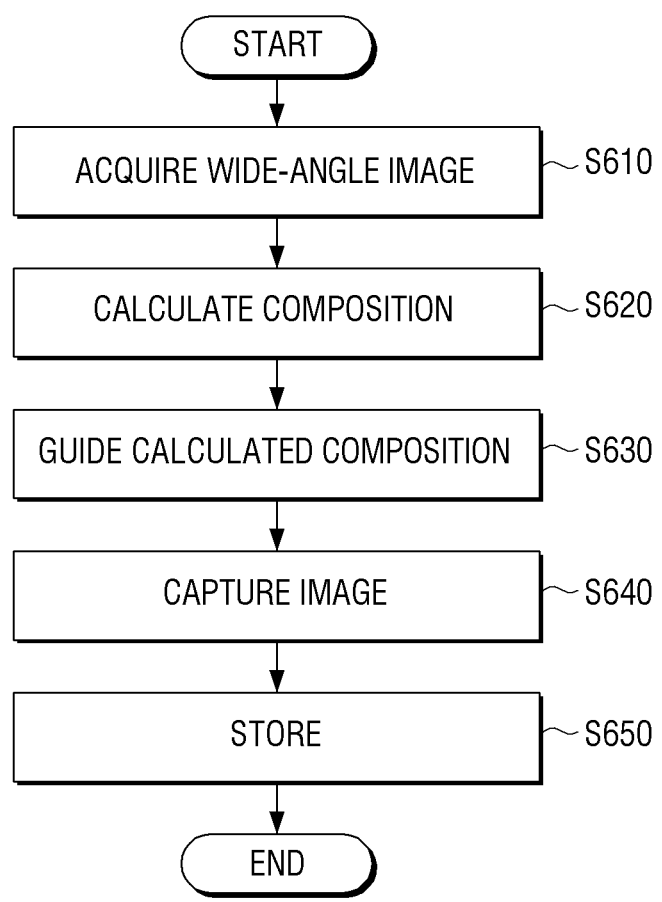
FIG. 6 is a flowchart provided to explain a method of providing composition according to an exemplary embodiment.

FIG. 6 is a flowchart provided to explain a method of providing composition according to another exemplary embodiment.

Referring to FIG. 6, at operation S610 a wide-angle image is generated. For example, if an image capturing unit provided is capable of capturing a wide-angle image, such an image capturing unit may be utilized to capture a wide-angle image. However, if the provided image capturing unit does not support a wide-angle image capturing function, a plurality of images having overlapping image pickup areas, or video having changed direction of capturing an image may be captured, and then a wide-angle image may be generated using the plurality of captured images or captured video.

At operation S620, an optimum composition of image pickup is calculated using the generated wide-angle image. For example, a subject of image pickup may be detected within the wide-angle image using the generated wide-angle image, and the optimum composition of image pickup may be calculated regarding the detected subject of image pickup. By way of example, if a user is taking a photograph of a person in front of a specific object (e.g., building), the building and the person may be detected as the subjects of image pickup, all the available candidates for the composition of image pickup may be extracted based on the two detected subjects, cost may be calculated in consideration of a plurality of evaluation standards with respect to the respective extracted candidates for composition of image pickup, and the optimum composition candidate may be selected based on the candidate for composition of image pickup with the highest cost. The scenes of the wide-angle image may be distinguished first, so that the distinguished scenes may be taken into consideration in calculating the optimum composition of image pickup, and the user's preferred composition information may be taken into consideration in calculating the optimum composition of image pickup.

At operation S630, a composition guide to help the user to capture an image according to the calculated optimum composition of image pickup is provided. The 'composition guide' herein refers to information that provides a zoom guide, an image capturing direction guide, or the like in the form of a message or indicating lines so that the user can capture an image according to the optimum calculated composition of image pickup. The currently-capturing image (i.e., live-view image) may be displayed along with the image according to the calculated optimum composition of image pickup, and it may be indicated on a display or other form that the currently-capturing image (i.e., live-view image) is in the optimum composition of image pickup, if it is determined to be the case.

At operation S640, an image is captured according to the optimum composition of image pickup. For example, the image may be captured according to a currently set composition of image pickup, if the user sets the composition according to the provided composition guide information and inputs a command to capture an image.

At operation S650, the captured image is stored.

As explained above, with a method of providing composition according to exemplary embodiments, a wide-angle image is generated to calculate optimum composition of image pickup. Accordingly, the user of the image pickup apparatus is enabled to capture even the objects or scenes that would be otherwise omitted due to oversight of the user at the time of capturing an image, and thus has a greater chance to capture an image of better composition. The method of providing composition, as the one illustrated in FIG. 6, may be implemented on an image pickup apparatus constructed in the manner illustrated in FIG. 1, or in other image pickup apparatuses with a different constitution.

Further, the method of providing composition according to the embodiments explained above may be implemented in the form of at least one execution program to execute the method of providing composition, and the execution program may be stored on a computer-readable recording medium.

Accordingly, each block according to an embodiment may be executed as computer-recordable code on a computer-readable recording medium. The computer-readable recording medium may be implemented as a device to store data that can be read by a computer system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image pickup apparatus, comprising:
    an image capturing unit which captures an image;
    a controller which controls the image capturing unit to generate a wide-angle image;
    a composition calculator which calculates an optimum composition of image pickup using the generated wide-angle image; and
    a user interface which provides composition guide information to capture the image according to the calculated optimum composition of image pickup and provides position guide information, based on a detected position of the image pickup apparatus and a detected direction of capturing an image of the image pickup apparatus, the position guide information indicating an optimum image pickup position from among a plurality of pre-stored optimum image pickup positions,
    wherein the image capturing unit captures a plurality of images having overlapping image pickup areas in a plurality of directions, and the image pickup apparatus further comprises an image processing unit which generates the wide-angle image using the plurality of captured images.

2. The image pickup apparatus of claim 1, wherein the image capturing unit captures a video having changed direction of capturing an image of the image pickup device, and the image pickup apparatus further comprises an image processing unit which generates a wide-angle image using the captured video.

3. The image pickup apparatus of claim 1, wherein the image capturing unit comprises:
    a first image capturing unit which captures an image using a first lens which can change a zoom ratio; and
    a second image capturing unit which captures a wide-angle image using a second lens which has a fixed ratio, and
    the controller controls the second image capturing unit to generate a wide-angle image, and
    the composition calculator calculates an optimum composition of image pickup with respect to an image to be captured through the first image capturing unit, using the wide-angle image generated at the second image capturing unit.

4. The image pickup apparatus of claim 1, wherein the composition calculator detects a subject of image pickup within the generated wide-angle image, and calculates an optimum composition of image pickup with respect to the detected subject of image pickup.

5. The image pickup apparatus of claim 1, wherein the composition calculator distinguishes scenes of the generated wide-angle image, and calculates the optimum composition of image pickup based on the distinguished scenes.

6. The image pickup apparatus of claim 4, further comprising:
    a storage unit which stores a user's preferred composition information,
    wherein the composition calculator calculates the optimum composition of image pickup based on the user's preferred composition information.

7. The image pickup apparatus of claim 1, wherein the user interface displays a currently-captured image along with an image according to the calculated optimum composition of image pickup.

8. The image pickup apparatus of claim 1, wherein the user interface determines whether a currently-captured image is according to the calculated optimum composition of image pickup and indicates the determination result.

9. The image pickup apparatus of claim 1, further comprising:
    a position determining unit which detects the position of the image pickup apparatus and the direction of capturing an image of the image pickup apparatus; and
    a storage unit which stores a plurality of optimum image pickup positions.

10. A method of providing a composition of image pickup of an image pickup apparatus, the method comprising:
    generating a wide-angle image;
    calculating an optimum composition of image pickup using the generated wide-angle image;
    providing composition guide information to capture the image according to the calculated optimum composition of image pickup;
    detecting the position of the image pickup device and the direction of capturing an image of the image pickup device; and
    providing position guide information, based on the detected position of the image pickup device and the detected direction of capturing an image of the image pickup device so that an image is captured at an optimum image pickup position which is previously stored;
    wherein the generating of the wide-angle image comprises capturing a plurality of images having overlapping image pickup areas, and generating the wide-angle image using the plurality of captured images.

11. The method of claim 10, wherein the generating of the wide-angle image comprises capturing video having changed direction of capturing an image of the image pickup device, and generating a wide-angle image using the captured video.

12. The method of claim 10, wherein the calculating comprises:
    detecting a subject of image pickup within the generated wide-angle image; and calculating an optimum composition of image pickup with respect to the detected subject of image pickup.

13. The method of claim 10, wherein the calculating comprises:
distinguishing scenes of the generated wide-angle image; and
calculating the optimum composition of image pickup based on the distinguished scenes.

14. The method of claim 12, wherein the calculating comprises:
calculating the optimum composition of image pickup based on pre-stored user's preferred composition information.

15. The method of claim 10, wherein the providing comprises:
displaying a currently-captured image along with an image according to the calculated optimum composition of image pickup.

16. The method of claim 10, wherein the providing comprises determining whether a currently-captured image is according to the calculated optimum composition of image pickup and indicating the determination result.

17. A non-transitory computer-readable recording medium comprising a program to execute a method of providing composition of image pickup, wherein the method comprises:
generating a wide-angle image;
calculating an optimum composition of image pickup using the generated wide-angle image;
providing composition guide information to capture the image according to the calculated optimum composition of image pickup;
detecting the position of the image pickup device and the direction of capturing an image of the image pickup device; and
providing position guide information, based on the detected position of the image pickup device and the detected direction of capturing an image of the image pickup device so that an image is captured at an optimum image pickup position which is previously stored;
wherein the generating of the wide-angle image comprises capturing a plurality of images having overlapping image pickup areas, and generating the wide-angle image using the plurality of captured images.

* * * * *